United States Patent [19]

Bryant, Jr.

[11] 4,023,371
[45] May 17, 1977

[54] RISER FOR AN OFFSHORE PLATFORM

[75] Inventor: Randolph Bryant, Jr., Katy, Tex.

[73] Assignee: Gulf Research & Development Company, Pittsburgh, Pa.

[22] Filed: May 27, 1976

[21] Appl. No.: 690,403

[52] U.S. Cl. .................................... 61/110; 166/.6
[51] Int. Cl.² ....................... F16L 1/00; E05D 1/06
[58] Field of Search ............ 61/110, 111, 107, 113; 166/.6

[56] References Cited

UNITED STATES PATENTS

| 3,226,728 | 12/1965 | Walvoord | 61/160 X |
| 3,702,539 | 11/1972 | Matthews, Jr. | 61/110 |
| 3,739,592 | 6/1973 | Plake | 61/110 |

Primary Examiner—Jacob Shapiro

[57] ABSTRACT

A riser having a 90° bend at its lower end is installed at an offshore platform by mounting the riser within casing with a horizontal leg from the 90° bend extending through a hole in the wall of the casing and lowering the casing through guide funnels extending inwardly from the framework of the platform. The guides have openings in their side walls facing inwardly through which the 90° bend passes as the casing and riser are lowered. When the 90° bend is a short distance above the ocean bottom, a lug on the casing enters an oblique slot in an orienting funnel. Further lowering of the casing causes orientation of the casing as the lug travels through the oblique slot to a position with the horizontal leg of the bend in the riser extending along the desired azimuth.

7 Claims, 6 Drawing Figures

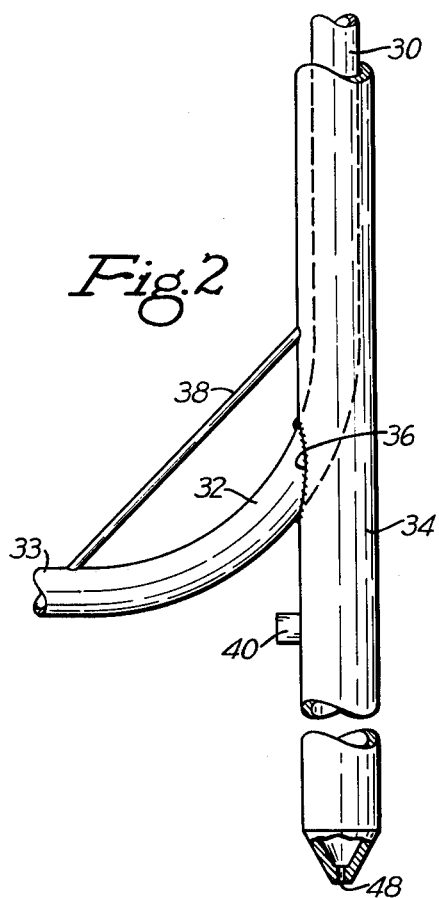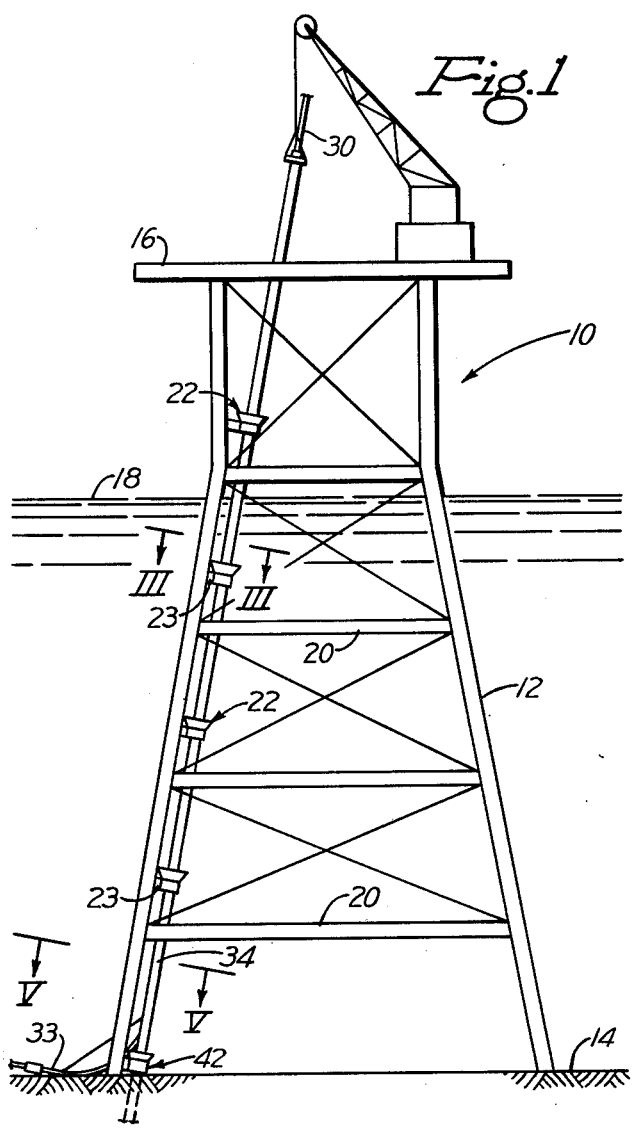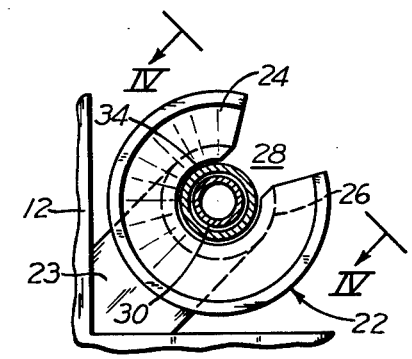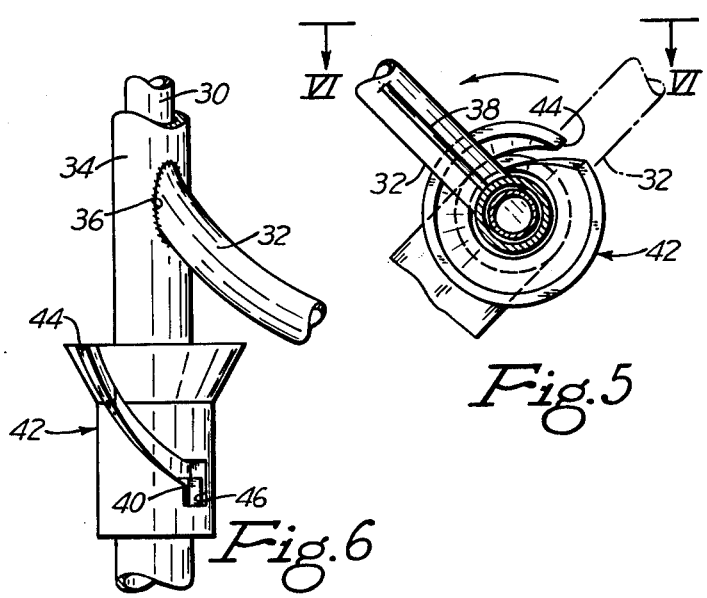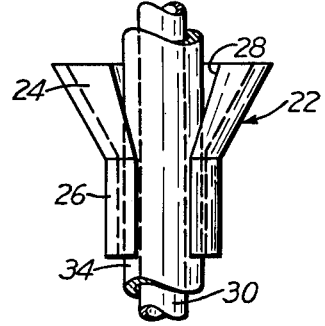

RISER FOR AN OFFSHORE PLATFORM

BACKGROUND OF THE INVENTION

1. Field of the Invention

This invention relates to offshore apparatus for the production of oil and gas and more particularly to a structure for installing a riser at an offshore platform.

2. Description of the Prior Art

Most wells completed offshore have the wellhead structure supported on a platform. Production from the well is delivered to onshore facilities through a pipeline along the ocean bottom. The pipeline is connected to the flow line from the well through a riser that extends from the ocean bottom at the base of the platform to the deck of the platform, at which the wellhead is located. The riser usually has a bend of substantially 90° for connection to the pipeline.

If the platform is in relatively shallow water, the connection between the lower end of the riser and the submerged pipeline is made by divers who weld the pipeline to the lower end of the riser. Many of the offshore wells now being completed are in water that is far deeper than the maximum depth at which divers can work. The connection of the pipeline to the riser at such deep water locations has been made by welding the pipeline to the bend of the riser at the platform deck or at the deck of a barge and gradually lowering the riser and pipeline to the bottom as additional lengths of pipe are welded to the riser, as disclosed in U.S. Pat. No. 3,698,199 to Matthews. This arrangement requires derrick barges which add greatly to the cost of making the connection. Moreover, the pipeline and riser are subjected to substantial strain as they are lowered to the ocean bottom.

U.S. Pat. No. 3,226,728 of Walvoord and U.S. Pat. No. 3,258,928 of Broadway et al disclose guides mounted on the framework of the derrick to support and guide the riser as it is lowered to the ocean bottom. In the structures described in both of the patents, the pipeline is subjected to a substantial bending force as it is lowered. U.S. Pat. Nos. 3,373,570 and 3,376,708, both of Hindman, disclose other guide structures for supporting the riser or the pipeline in which the final connection of the riser to the pipeline is made by a stabbing procedure.

In U.S. Pat. No. 3,690,112 of Pattison et al, the free end of the pipeline is connected to a pipe guide which is pulled into a structural guide at the base of the platform. A riser guide accurately positions the riser as it is lowered for stabbing connection to a vertical leg connected at the pipe guide to the end of the pipeline. U.S. Pat. No. 3,739,592 of Plake describes a platform structure in which the riser is encased within a casing. Locking cones secured to the casing are pulled into guide cones mounted on the platform to anchor the riser firmly in position. Presumably the pipeline is connected to the lower end of the riser by divers.

SUMMARY OF THE INVENTION

This invention resides in a method and apparatus for installing at an offshore platform a riser which includes a substantially 90° bend at its lower end and orienting the riser to position the substantially horizontal part of the bend in the desired direction for connecting to a pipeline. A protective casing enclosing the riser is lowered through guide funnels mounted on the platform frame. The guide funnels have an elongated opening extending from the upper to the lower end through which the bend of the riser passes as the riser is lowered. An orienting funnel mounted on the frame of the platform in alignment with the guide funnels and in position to receive the casing has an orienting slot therein adapted to receive a lug on the casing. As the casing and riser are lowered, the lug enters the orienting slot and turns the casing to orient the riser pipe in the desired direction.

BRIEF DESCRIPTION OF THE DRAWINGS

FIG. 1 is a schematic view in elevation of an offshore platform during the lowering of the riser into position.

FIG. 2 is a fragmentary view in elevation of the lower end of the casing having the riser pipe therein.

FIG. 3 is a horizontal sectional view taken along line III—III in FIG. 1 showing a plan view of a guide funnel.

FIG. 4 is a view in elevation of a guide funnel.

FIG. 5 is a sectional view taken along section V—V in FIG. 1 showing the orienting funnel in plan.

FIG. 6 is a fragmentary view in elevation of the orienting funnel with the casing and riser in the final desired position.

DESCRIPTION OF PREFERRED EMBODIMENT

Referring to FIG. 1 of the drawings, a platform indicated generally by reference numeral 10 is shown having legs 12 suitably anchored in the ocean bottom 14. Platform 10 has a deck 16 supported at a sufficient height above the water surface 18 to avoid wave action. Platform 10 is provided with sufficient framework including cross members 20 to provide a structure having strength and rigidity adequate to support equipment on the deck and withstand wave action.

Mounted in alignment with one another on the platform are a plurality of guide funnels 22 spaced at vertical intervals over substantially the full height of the platform. Preferably, the guide funnels 22 are mounted on the platform during construction of the platform before it is installed at the offshore location. If the platform is for installation in deep water locations, such installation of the guide funnels before the platform is located on site is essential. Although it is preferred that the guide funnels 22 be supported from a leg of the platform, for example by suitable brackets 23, the guide funnels may be supported from the framework such as from cross members 20. It is an important advantage of this invention that the guide funnels are within the framework of the platform to protect the casing and riser hereinafter described from damage by collision.

As is best shown in FIGS. 3 and 4, guide funnels 22 in their preferred form include an upper upwardly opening cone 24 and a sleeve 26 extending downwardly from the lower end of cone 24. The side wall of the guide funnels has an opening 28 extending the full vertical length of the cone. Openings 28 face toward the center of the platform.

A riser pipe 30 which includes a substantially 90° bend 32 at its lower end to provide a substantially horizontal leg 33 for connection to the pipeline is mounted within casing 34. The bend 32 extends through a hole 36 in the wall of the casing and the space between the outer surface of the bend 32 and the perimeter of hole 36 is closed by welding. A brace 38 may be welded to joint 32 and casing 34 to increase the rigidity of the assembled casing and riser pipe. In the embodiment shown, a lug 40 extends outwardly from the casing 34 directly below the bend 32.

The casing 34 with the riser pipe 30 therein is lowered from the deck through guide funnels 22. The bend 32 is oriented to extend inwardly toward the center of the platform 10 as the casing is lowered. During the lowering operation, additional sections of riser pipe 30 and casing 34 are welded to the free upper end to provide a riser pipe and casing of the necessary length. As the riser is lowered, bend 32 extends inwardly toward the center of platform 10 and passes through the openings 28 in the side wall of the guide funnels 22. This orientation allows the bend to clear the cross members 20 of the platform. The width of opening 28 is larger than the outside diameter of riser pipe 30 and at least through sleeve 26 is smaller than the outside diameter of the casing 34. The guide funnels, therefore, hold the casing firmly in place.

Mounted on the platform substantially at the level of the ocean bottom and in alignment with the guide funnels 22 is an orienting funnel 42, best shown in FIG. 6 of the drawings. Orienting funnel 42 has an oblique guide slot 44 positioned to receive the lug 40 extending from the outer surface of casing 34. The lower surface of oblique slot 44 at the lower end thereof is notched to form a locking chamber 46 which fixes the orientation of the casing.

As the riser is lowered sufficiently that the bend 32 is below the lowest cross member 20, the lug 40 enters the upper end of orienting slot 44. Continued lowering of the casing 34 and riser pipe results in lug 40 traveling through oblique slot 44 and rotating the casing to move the bend 32 from the inner position, shown in phantom in FIG. 5, below the lowest cross member 20 to a position extending outwardly in the desired direction from the platform, as shown in solid lines in FIG. 5. For added stability, it is preferred that the lower end of the casing below the lug 40 be partially closed to form a nozzle 48, as illustrated in FIG. 2. Water is pumped through the casing and jetted from the nozzle 48 to dig a hole in the ocean bottom into which the casing 34 can enter as it is lowered. After the casing 34 and riser have been lowered and properly oriented by entry of the lug 40 into locking chamber 46, a float having a cable attached to it is pumped down the riser pipe and out of its lower end. The float lifts the cable to the surface of the water for attachment to the free end of a pipeline which can then be connected to the bend of the riser by stabbing operations such as disclosed in U.S. Pat. Nos. 3,373,570 and 3,690,112, supra, and in U.S. Pat. No. 3,729,941 of Rochelle, for example.

Although it is preferred that the orienting funnel be located substantially at the ocean bottom, it could be located, for example, at the level of the top guide funnel shown in FIG. 1. In that event, the orienting funnel would necessarily have an opening corresponding to opening 28 through which the pipe bend 32 could pass and an orienting slot corresponding to slot 44 spaced from the opening. The lug adapted to enter the orienting slot would then be located near the upper end of casing 34. The arrangement shown in FIG. 1 with the orienting funnel near the ocean bottom is preferred because it provides means for exerting torque near the lower end of the casing to rotate the casing to the desired position. Additional torque then easily can be applied as needed to the upper end of the casing by means of conventional tools operated at the level of the platform.

The riser structure described herein is asembled on the deck of a platform and lowered to the ocean bottom without requiring a derrick barge to support the riser and connected pipeline as it is lowered into position. As illustrated in the drawing, a crane on the deck of the platform is adequate for lowering the riser. The riser is fully protected by casing which completely encloses all of the riser above the 90° bend at its lower end. The riser is further protected by its location within the framework of the platform. The weight of the casing and riser holds the lug on the casing securely in the lowermost portion of the orienting slot in the orienting funnel and accurately orients the horizontal leg of the 90° bend at the lower end of the riser in the desired azimuth.

I claim:

1. Apparatus for installing a flow line riser pipe at an offshore platform comprising a plurality of vertically spaced guide funnels mounted in alignment on the frame of the platform, a casing extending downwardly through the guide funnels, said casing having a hole in the wall thereof near its lower end, a riser extending downwardly through the casing, said riser having a substantially 90° bend at its lower end and a substantially horizontal leg extending outwardly through the hole in the wall of the casing, an inwardly facing opening in the wall of each guide funnel extending the full length thereof through which the horizontal leg passes on lowering the riser, an orienting funnel in alignment with the guide funnels, an oblique orienting slot in the wall of the orienting funnel, and a lug extending outwardly from the casing positioned to enter the slot and turn the casing on downward movement of the casing.

2. Apparatus as set forth in claim 1 in which the orienting funnel is located below the lowest guide funnel, the upper end of the orienting slot is in alignment with the openings in the guide funnel and the lug is directly below the hole in the casing through which the bend extends.

3. Apparatus as set forth in claim 2 in which the orienting slot is adapted to rotate the casing for the substantially horizontal leg of the bend to extend outwardly from the platform.

4. Apparatus as set forth in claim 2 in which the openings in the side walls of the guide funnels have a width larger than the outside diameter of the riser pipe and smaller than the outside diameter of the casing.

5. Apparatus as set forth in claim 2 in which the casing is tapered at its lower end and has an opening of smaller diameter forming a nozzle at said lower end.

6. Apparatus as set forth in claim 2 characterized by a notch in the lower surface of the orienting slot at the lower end thereof forming a chamber locking the casing in the desired orientation.

7. A method of installing a riser pipe at an offshore platform comprising assembling a riser pipe including a 90° bend within casing with a substantially horizontal leg of the bend extending laterally through an opening in the wall of the casing, lowering the casing into and through guide funnels extending inwardly from the frame of the platform, said guide funnels having an opening facing inwardly generally toward the center of the platform through which the 90° bend in the riser pipe passes, connecting additional joints of pipe to the riser and casing as the casing is lowered toward the ocean bottom until the 90° bend in the riser pipe is just above the ocean bottom, lowering the casing to insert a lug thereon into an oblique slot in an orienting funnel mounted on the frame of the platform in alignment with the guide funnels, continuing to lower the casing whereby the lug travels in the oblique slot and rotates the casing to orient the casing with the horizontal leg of the riser pipe extending outwardly from the platform.

* * * * *